US010822997B2

(12) United States Patent
Graham et al.

(10) Patent No.: US 10,822,997 B2
(45) Date of Patent: Nov. 3, 2020

(54) INSPECTION TOOL AND METHOD

(71) Applicant: General Electric Company, Schenectady, NY (US)

(72) Inventors: Andrew Crispin Graham, Badminton (GB); Lyle Timothy Rasch, Fairfield, OH (US); Michael Dean Fullington, West Chester, OH (US); Wayne Ray Grady, Hamilton, OH (US); David Scott Diwinsky, West Chester, OH (US)

(73) Assignee: General Electric Company, Schenectady, NY (US)

( * ) Notice: Subject to any disclaimer, the term of this patent is extended or adjusted under 35 U.S.C. 154(b) by 203 days.

(21) Appl. No.: 16/008,454

(22) Filed: Jun. 14, 2018

(65) Prior Publication Data

US 2019/0383161 A1    Dec. 19, 2019

(51) Int. Cl.
  *F01D 21/00*  (2006.01)
(52) U.S. Cl.
  CPC ........ *F01D 21/003* (2013.01); *F05D 2260/80* (2013.01)
(58) Field of Classification Search
  CPC .............. F01D 21/003; F05D 2260/80; G01N 2291/2693; G01N 29/225; G01N 29/043
  See application file for complete search history.

(56) References Cited

U.S. PATENT DOCUMENTS

| | | | |
|---|---|---|---|
| 5,111,048 A | 5/1992 | Devitt et al. | |
| 5,623,107 A | 4/1997 | Patterson, Sr. et al. | |
| 5,625,958 A | 5/1997 | DeCoursey et al. | |
| 6,394,646 B1 | 5/2002 | Ringermacher et al. | |
| 6,442,237 B1* | 8/2002 | Corby, Jr. ............. | G01N 23/04 378/58 |
| 6,484,583 B1* | 11/2002 | Chennell ............. | G01N 29/225 73/623 |

(Continued)

FOREIGN PATENT DOCUMENTS

JP   2000/338090 A   12/2000
KR    101416164 B1    7/2014

OTHER PUBLICATIONS

Sandia National Laboratories, Multi-Robot Cooperative Behavior, 2018, 5 pages. http://www.sandia.gov/research/robotics/advanced_controls/multi_robot_cooperative_behavior.html.

(Continued)

*Primary Examiner* — Freddie Kirkland, III
(74) *Attorney, Agent, or Firm* — Dority & Manning, P.A.

(57) ABSTRACT

An engine assembly includes an engine including a component and defining an opening and an interior, the component including a first side and an opposite second side, the second side positioned within the interior of the engine. The engine assembly also includes an inspection tool having a first member including at least one of a receiver or a transmitter and directed at the first side of the component. The inspection tool also includes a second member including the other of the receiver or the transmitter and positioned at least partially within the interior of the engine and directed at the second side of the component to communicate a signal with the first member through the component, the second member being a robotic arm extending through the opening of the engine.

20 Claims, 7 Drawing Sheets

(56) References Cited

U.S. PATENT DOCUMENTS

| | | | |
|---|---|---|---|
| 6,532,840 B2* | 3/2003 | Hatley | B25J 5/00 356/241.1 |
| 7,171,279 B2* | 1/2007 | Buckingham | A61B 1/0055 318/568.12 |
| 7,271,894 B2* | 9/2007 | Devitt | F01D 21/003 356/241.1 |
| 7,627,083 B2* | 12/2009 | Ross | G01N 23/04 378/196 |
| 8,151,647 B2* | 4/2012 | Twerdochlib | G01H 1/006 702/56 |
| 8,641,374 B2 | 2/2014 | Byreddy et al. | |
| 8,743,196 B2 | 6/2014 | Fritz et al. | |
| 8,791,998 B2 | 7/2014 | Hori | |
| 9,068,906 B2 | 6/2015 | Silieti et al. | |
| 9,170,193 B2 | 10/2015 | Xu et al. | |
| 9,347,899 B2 | 5/2016 | Henderkott et al. | |
| 9,400,217 B2 | 7/2016 | Baleine et al. | |
| 9,400,256 B2 | 7/2016 | Henderkott et al. | |
| 9,709,463 B2* | 7/2017 | DeAscanis | G01M 15/14 |
| 9,726,628 B2 | 8/2017 | Ruhge et al. | |
| 9,823,460 B2* | 11/2017 | Kobayashi | G01B 11/24 |
| 9,857,227 B1 | 1/2018 | Boudin et al. | |
| 10,142,565 B2* | 11/2018 | Boudin | H04N 5/33 |
| 10,196,922 B2* | 2/2019 | Diwinsky | F01D 17/02 |
| 2003/0154801 A1 | 8/2003 | Georgeson | |
| 2003/0229420 A1* | 12/2003 | Buckingham | A61B 1/0055 700/245 |
| 2005/0073673 A1* | 4/2005 | Devitt | F01D 21/003 356/37 |
| 2006/0053891 A1 | 3/2006 | Georgeson et al. | |
| 2008/0226028 A1* | 9/2008 | Ross | G01N 23/04 378/58 |
| 2014/0067185 A1 | 3/2014 | Tralshawala et al. | |
| 2016/0011078 A1 | 1/2016 | Ruhge | |
| 2016/0075020 A1 | 3/2016 | Szarski et al. | |
| 2016/0091463 A1 | 3/2016 | Barry | |
| 2017/0070686 A1* | 3/2017 | Boudin | H04N 5/33 |
| 2017/0167285 A1* | 6/2017 | Diwinsky | F01D 17/02 |
| 2017/0359530 A1 | 12/2017 | Boudin et al. | |
| 2018/0013959 A1 | 1/2018 | Slavens et al. | |

OTHER PUBLICATIONS

International Search Report Corresponding to Application No. PCT/US2019/037019 dated Sep. 20, 2019.

* cited by examiner

INSPECTION TOOL AND METHOD

FIELD

The present subject matter relates generally to a tool and method for inspecting a component of an engine.

BACKGROUND

At least certain gas turbine engines include, in serial flow arrangement, a compressor section including a low pressure compressor and a high-pressure compressor for compressing air flowing through the engine, a combustor for mixing fuel with the compressed air such that the mixture may be ignited, and a turbine section including a high pressure turbine and a low pressure turbine for providing power to the compressor section.

Through continuous operation of the gas turbine engine, certain components of the gas turbine engine may form defects. Various inspection systems for inspecting these components have been developed that utilize reflective signal systems (i.e., that transmit a signal and sense a reflected signal from the component) to determine whether or not any defects are present in the component. Such systems may be effective in determining the presence of defects on or near a surface of the components. However, such systems may be relatively inefficient at sensing defects positioned beneath the surface of the component, such as deep within the component.

Accordingly, a tool and method for inspecting a component of a gas turbine engine capable of determining the presence of defects within a component would be useful.

BRIEF DESCRIPTION

Aspects and advantages of the invention will be set forth in part in the following description, or may be obvious from the description, or may be learned through practice of the invention.

In one embodiment of the present disclosure, an engine assembly is provided. The engine assembly includes an engine including a component and defining an opening and an interior, the component including a first side and an opposite second side, the second side positioned within the interior of the engine. The engine assembly also includes an inspection tool having a first member including at least one of a receiver or a transmitter and directed at the first side of the component. The inspection tool also includes a second member including the other of the receiver or the transmitter and positioned at least partially within the interior of the engine and directed at the second side of the component to communicate a signal with the first member through the component, the second member being a robotic arm extending through the opening of the engine.

In certain exemplary embodiments the first member includes the transmitter, and wherein the second member includes the receiver.

In certain exemplary embodiments the engine is a turbomachine of a gas turbine engine.

For example, in certain exemplary embodiments the opening is a borescope opening.

For example, in certain exemplary embodiments the turbomachine defines a core air flowpath, and wherein the second side of the component is positioned within the core air flowpath.

For example, in certain exemplary embodiments the turbomachine defines a core air flowpath, and wherein the second side of the component is positioned outside of the core air flowpath.

In certain exemplary embodiments the first member is positioned outside of the interior of the engine.

In certain exemplary embodiments the signal communicated between the first member and the second member through the component is at least one of an infrared signal, an ultrasound signal, an x-ray signal, or an inductive heat signal.

In certain exemplary embodiments the component of the engine is an airfoil, a shroud, or a liner.

In certain exemplary embodiments the robotic arm defines a distal end, and wherein the receiver or the transmitter is positioned at the distal end of the robotic arm.

In certain exemplary embodiments the robotic arm includes a plurality of segments moveable relative to one another.

For example, in certain exemplary embodiments the robotic arm extends between a root end and a distal end, wherein the plurality of segments extend from the root end to the distal end, and wherein the receiver or the transmitter is positioned at the distal end of the robotic arm.

In certain exemplary embodiments the robotic arm defines a length between the root end and the distal end of at least about 48 inches, and wherein the robotic arm defines a maximum diameter of less than about 3 inches.

In one exemplary aspect of the present disclosure, a method for inspecting a component of an engine using an inspection tool is provided. The method includes directing a first member of the inspection tool towards a first side of the component; positioning the second member of the inspection tool at least partially within an interior of the engine; directing the second member of the inspection tool towards a second side of the component, the second member being a robotic arm; and communicating a signal between the first member of the inspection tool and the second member of the inspection tool through the component to inspect the component for defects located between the first side and second side of the component.

In certain exemplary aspects positioning the second member of the inspection tool at least partially within the interior of the engine includes inserting the second member of the inspection tool through an opening of the engine.

In certain exemplary aspects communicating the signal between the first member of the inspection tool and the second member of the inspection tool through the component includes transmitting a signal from the first member or the second member and receiving a signal from the other of the first member or the second member.

In certain exemplary aspects the first member includes one of a receiver or a transmitter, and wherein directing the first member of the inspection tool towards the first side of the component includes directing one of the receiver or the transmitter of the first member of the inspection tool towards the first side of the component.

In certain exemplary aspects the second member includes the other of the receiver or the transmitter, and wherein directing the second side of the inspection tool towards the second side of the component includes directing the other of the receiver or the transmitter of the second member towards the second side of the component.

In another exemplary embodiment of the present disclosure, a tool for inspecting an engine is provided. The engine includes a component, the component having a first side and a second side, the first side being within an interior of the engine. The tool includes a first member including at least one of a receiver or a transmitter; and a second member including the other of the receiver or the transmitter and configured as a robotic arm, the robotic arm moveable to the interior of the engine to a location directed at the second side of the component to communicate a signal with the first member through the component for inspecting the component.

In certain exemplary embodiments the first member includes the transmitter, and wherein the second member includes the receiver.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions of a component or system. For example, with respect to a gas turbine engine, these terms refer to the normal operational attitude of the gas turbine engine or vehicle (e.g., with forward referring to a position closer to an engine inlet and aft referring to a position closer to an engine nozzle or exhaust). Similarly, with other components, these terms refer to a normal operational attitude of the component, such that forward refers to a position closer to a leading end and aft refers to a position closer to a trailing end.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Figure 1:
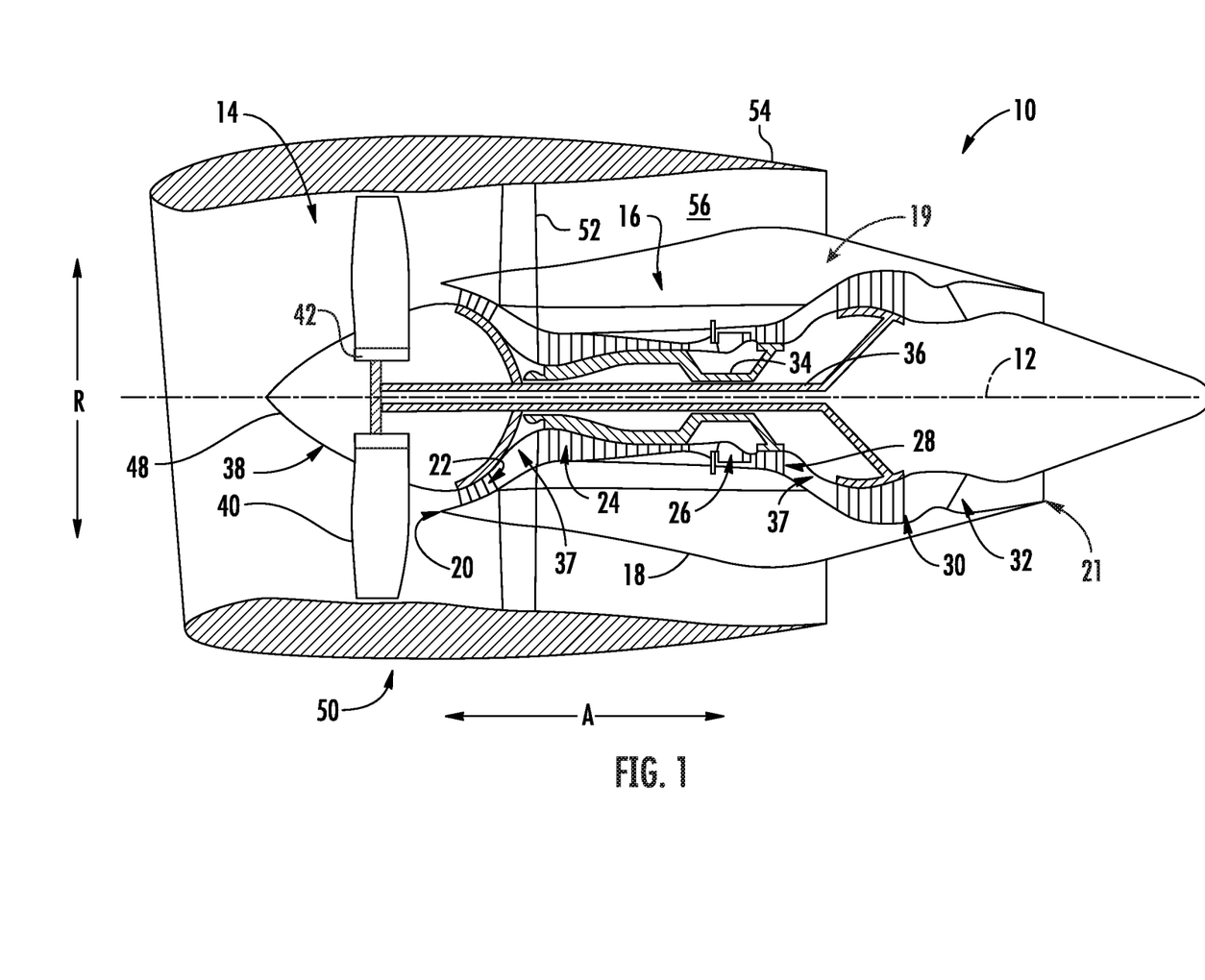
FIG. 1 is a schematic, cross-sectional view of a gas turbine engine in accordance with an exemplary aspect of the present disclosure.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. The turbofan engine 10 also defines a circumferential direction C (see FIG. 3) extending circumferentially about the axial direction A. In general, the turbofan 10 includes a fan section 14 and a turbomachine 16 disposed downstream from the fan section 14.

The exemplary turbomachine 16 depicted generally defines an interior 19 including various components thereof. More specifically, the exemplary turbomachine 16 includes a tubular outer casing 18, with everything inside the tubular outer casing 18 being referred to herein as the interior 19 of the turbomachine 16. Additionally, the tubular outer casing 18 defines an annular inlet 20 and an annular exhaust 21. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30;

and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The compressor section, combustion section 26, turbine section, and nozzle section 32 together define a core air flowpath 37 therethrough.

For the embodiment depicted, the fan section 14 includes a fixed pitch fan 38 having a plurality of fan blades 40. The fan blades 40 are each attached to a disk 42, with the fan blades 40 and disk 42 together rotatable about the longitudinal axis 12 by the LP shaft 36. For the embodiment depicted, the turbofan engine 10 is a direct drive turbofan engine, such that the LP shaft 36 drives the fan 38 of the fan section 14 directly, without use of a reduction gearbox. However, in other exemplary embodiments of the present disclosure, the fan 38 may instead be a variable pitch fan, and the turbofan engine 10 may include a reduction gearbox, in which case the LP shaft 36 may drive the fan 38 of the fan section 14 across the gearbox.

Referring still to the exemplary embodiment of FIG. 1, the disk 42 is covered by rotatable front hub 48 aerodynamically contoured to promote an airflow through the plurality of fan blades 40. Additionally, the exemplary turbofan engine 10 includes an annular nacelle assembly 50 that circumferentially surrounds the fan 38 and/or at least a portion of the turbomachine 16. For the embodiment depicted, the nacelle assembly 50 is supported relative to the turbomachine 16 by a plurality of circumferentially-spaced outlet guide vanes 52. Moreover, a downstream section 54 of the nacelle assembly 50 extends over an outer portion of the casing 18 so as to define a bypass airflow passage 56 therebetween. The ratio between a first portion of air through the bypass airflow passage 56 and a second portion of air through the inlet 20 of the turbomachine 16, and through the core air flowpath 37, is commonly known as a bypass ratio.

It will be appreciated that although not depicted in FIG. 1, the turbofan engine 10 may further define a plurality of additional openings allowing for inspection of various components within the turbomachine 16. For example, the turbofan engine 10 may define a plurality of borescope openings at various axial positions within the compressor section, combustion section 26, and turbine section. Additionally, the turbofan engine 10 may include one or more igniter ports within, e.g., the combustion section 26 of the turbomachine 16, that may allow for inspection of the combustion section 26.

It should be appreciated, however, that the exemplary turbofan engine 10 depicted in FIG. 1 is by way of example only, and that in other exemplary embodiments, the turbofan engine 10 may have any other suitable configuration, including, for example, any other suitable number of shafts or spools, turbines, compressors, etc. Additionally, or alternatively, in other exemplary embodiments, any other suitable turbine engine may be provided. For example, in other exemplary embodiments, the turbine engine may not be a turbofan engine, and instead may be configured as a turboshaft engine, a turboprop engine, turbojet engine, etc.

Figure 2:
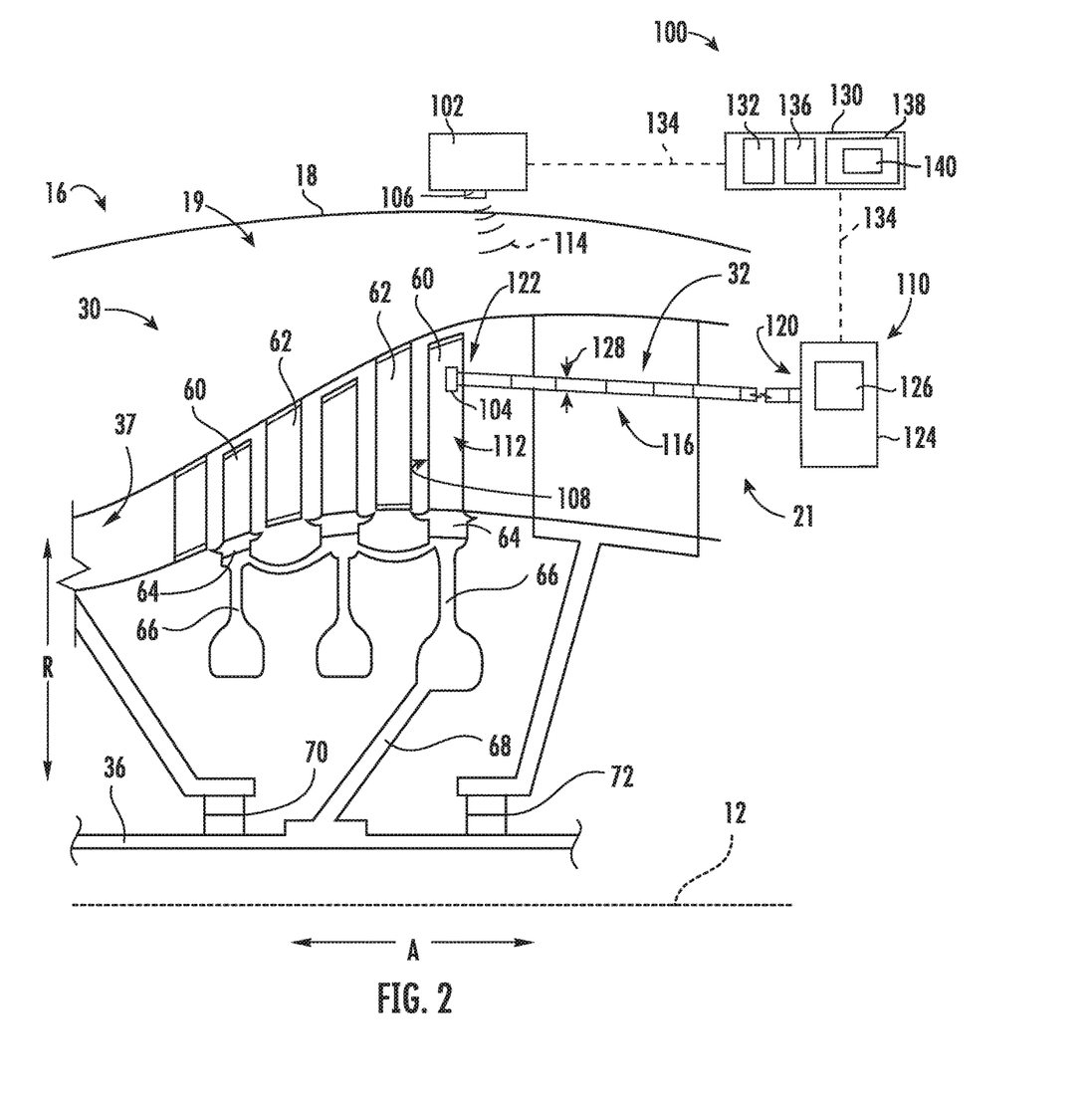
FIG. 2 is a close-up, cross-sectional view of an aft end of the exemplary gas turbine engine of FIG. 1 including an inspection system in accordance with an exemplary embodiment of the present disclosure.

Referring now to FIG. 2, a close-up, schematic view of an aft end of the turbomachine 16 of the exemplary turbofan engine 10 of FIG. 1 is provided. Specifically, FIG. 2 provides a close-up, schematic view of the LP turbine 30 of the turbine section of the exemplary turbofan engine 10 of FIG. 1.

As is depicted, the LP turbine 30 generally includes alternating stages of LP turbine rotor blades 60 and LP turbine stator vanes 62. Each of the plurality LP turbine rotor blades 60 are attached at a base 64 to a respective LP turbine rotor 66. The LP turbine rotor 66 of each stage of LP turbine rotor blades 60 is connected to an adjacent LP turbine rotor 66—the plurality of LP turbine rotors 66 further connected to the LP shaft 36 through an LP shaft extension 68. Accordingly, a flow of combustion gasses through the LP turbine 30 rotates the plurality of LP turbine rotor blades 60 and LP turbine rotors 66, which in turn rotates the LP shaft 36. Additionally, as noted, the LP turbine 30 includes the plurality of stages of LP turbine stator vanes 62, each of which attached to the casing 18 of the turbomachine 16. As will be appreciated, the stages of LP turbine stator vanes 62 may increase an efficiency of the LP turbine 30. For the embodiment depicted, each stage of LP turbine stator vanes 62 is positioned between adjacent stages of LP turbine rotor blades 60 or adjacent to a stage of LP turbine rotor blades 60.

Briefly, it will further be appreciated, that for the embodiment depicted, the LP shaft 36 is supported by a forward bearing 70 and an aft bearing 72. It should be appreciated, however, that in other exemplary embodiments, the LP shaft 36 may instead be supported in any other suitable manner. For example, in other exemplary embodiments, both the forward and aft bearings 70, 72 may be positioned forward of the extension member 68 of the LP shaft 36, or alternatively, may both be positioned aft of the extension member 68 of the LP shaft 36. Further, it will be appreciated that although the exemplary LP turbine 30 depicted includes three stages of LP turbine rotor blades 30 and LP turbine stator vanes 62, in other exemplary embodiments, the LP turbine 30 may include any other suitable number and/or configuration of stages of LP turbine rotor blades 60 and/or stator vanes 62. Other configurations are contemplated as well.

Referring still to FIG. 2, an inspection tool 100 is also provided. The inspection tool 100 generally includes a first member 102 having at least one of a receiver 104 or a transmitter 106 and directed at a first side 108 of a component of the turbomachine 16. The inspection tool 100 additionally includes a second member 110 having the other of the receiver 104 or the transmitter 106 and positioned at least partially within the interior 19 of the engine (i.e., the turbomachine 16 for the embodiment shown) and directed at a second side 112 of the component to communicate a signal 114 with the first member 102 through the component (i.e., communicate the signal 114 between the first side 108 and second side 112 of the component). As will be discussed in greater detail below, such may allow the inspection tool 100 to detect one or more defects 142 within an interior of the component, between the first side 108 and the second side 112 of the component. Notably, as used herein, the term "directed at" with respect to the receiver 104 and transmitter 106 refers to the receiver 104 and transmitter 106 being positioned and oriented to receive the signal 114 from, or transmit the signal 114 to, respectively, the side of the component at which is "directed."

More specifically, for the embodiment depicted, the first member 102 includes the transmitter 106 for transmitting the signal 114 and the second member 110 includes the receiver 104 for receiving the signal 114. More specifically still, for the embodiment depicted, the second member 110 is a robotic arm assembly including a robotic arm 116. For the embodiment depicted, the robotic arm 116 includes a plurality of segments 118 movable relative to one another. Additionally, the robotic arm 116 extends between a root end 120 and a distal end 122. Further, the robotic arm assembly additionally includes a base 124, with the root end 120 of the robotic arm 116 coupled to the base 124. The base 124 includes one or more motors 126 operable with the robotic arm 116 for moving one or more of the plurality of segments 118 of the robotic arm 116. In such a manner, the robotic arm 116 may be maneuvered through the interior 19 of the turbomachine 16, such that it may direct the receiver 104 towards the second side 112 of the component. Notably, for the embodiment depicted, the receiver 104 is positioned at the distal end 122 of the robotic arm 116.

Additionally, for the embodiment depicted, the first member 102, including the transmitter 106, is not positioned within the interior 19 of the turbomachine 16 (i.e., is positioned outside of the interior 19 of the turbomachine 16). However, by positioning the receiver 104 in the interior 19 of the turbomachine 16 and directed at the second side 112 of the component, the inspection tool 100 may be successfully utilized for inspecting the component, which may be positioned at a relatively remote location, for defects 142. Notably, for the embodiment of FIG. 2, the turbomachine 16 defines an opening, and more specifically, defines an annular exhaust 21 and exhaust section 32 (see also FIG. 1). The robotic arm 116 may extend through such opening to position itself near the component for directing the receiver 104 at the second side 112 of the component.

It will be appreciated that with such a configuration, the component of the turbomachine 16 may be any suitable component having at least one side positioned at least partially within the interior 19 of the turbomachine 16. For example, the component of the turbomachine 16 may be more one or more of an airfoil, such as an LP turbine stator vane 62 or LP turbine rotor blade 60 (or any other turbine or compressor stator vane, or turbine or compressor rotor blade, or any other guide vane), a shroud, a liner (such as a combustion chamber liner), etc.

Briefly, it will be appreciated that the robotic arm 116 may define certain parameters to further enable it to reach the relatively remote positions within the interior 19 of the turbomachine 16. More specifically, for the embodiment shown, the robotic arm 116 defines a length between the root end 120 in the distal end 122 of least about thirty-six (36) inches, such as at least about forty-eight (48) inches, such as at least about sixty (60) inches, such as up to about 600 inches. Similarly, the robotic arm 116 defines a maximum diameter 128 between the root end 120 and the distal end 122, which for the embodiment depicted is a maximum diameter 128 of each of the individual segments 118 of the robotic arm 116, less than about five (5) inches. For example, the maximum diameter 128 of the robotic arm 116 may be less than about three (3) inches, such as less than about 2.5 inches, such as less than about one (1) inch. Such may further allow the robotic arm 116 to reach the relatively remote locations within the interior 19 of the turbomachine 16.

As is also depicted in FIG. 2, the robot arm assembly 100 further includes a controller 130. Although the controller 130 is depicted as being positioned physically separate from the robotic arm assembly (i.e., the second member 110), in other embodiments, the controller 130 may be positioned, or otherwise integrated into, the base 124 of the robotic arm assembly. Additionally, or alternatively, the controller 130 may be integrated into, and/or operable with, any other suitable system.

The controller 130 generally includes a network interface 132. The network interface 132 may be operable with any suitable wired or wireless communications network for communicating data with other components of, e.g., the robotic arm assembly 100, and/or other components or systems not depicted. As depicted using phantom lines in FIG. 2, for the embodiment depicted, the network interface 132 utilizes a wireless communication network 134 to communicate data with other components. Specifically, for the embodiment shown, through the network interface 132 of the controller 130 and the wireless communication network 134, the controller 130 is operably coupled to the base 124 of the robotic arm assembly, and more specifically, is operably coupled to the one or more motors 126 of the base 124 of the robotic arm assembly. In such a manner, the controller 130 may control operation of the robotic arm 116 by controlling operation of the one or more motors 126. Also through the network interface 132 and wireless communications network 134, the controller 130 is operably coupled to the receiver 104 (through the second member 110) and the transmitter 106 (through the first member 102).

It will be appreciated, of course, that although the network interface 132 utilizes the wireless communication network 134 for the embodiment of FIG. 2, in other embodiments, the network interface 132 may instead utilized a wired communication network, or a combination of wired and wireless communication networks.

Referring still to FIG. 2, the controller 130 further includes one or more processors 136 and memory 138. The memory 138 stores data 140 accessible by the one or more processors 136. The one or more processor(s) 136 can include any suitable processing device, such as a microprocessor, microcontroller, integrated circuit, logic device, and/or other suitable processing device. The one or more memory device(s) 138 can include one or more computer-readable media, including, but not limited to, non-transitory computer-readable media, RAM, ROM, hard drives, flash drives, and/or other memory devices. The data 140 may include instructions that when executed by the one or more processors 136 cause the inspection tool 100 to perform functions. One or more exemplary aspects of these functions may be described below with respect to the exemplary method 200 of FIG. 7.

The instructions within the data 140 can be any set of instructions that when executed by the one or more processor(s) 136, cause the one or more processor(s) 136 to perform operations. In certain exemplary embodiments, the instructions within the data 140 can be software written in any suitable programming language or can be implemented in hardware. Additionally, and/or alternatively, the instructions can be executed in logically and/or virtually separate threads on processor(s) 136. The memory device(s) 138 can further store other data 140 that can be accessed by the processor(s) 136.

Figure 3:
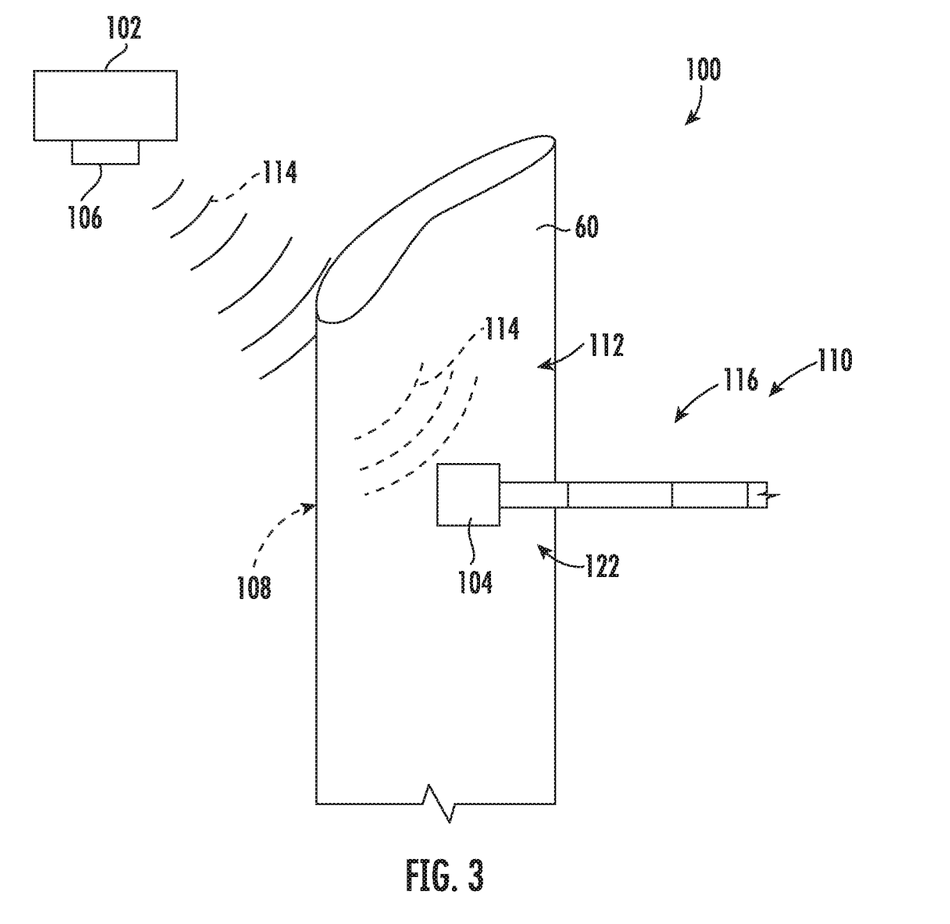
FIG. 3 is a close-up, perspective view of the exemplary inspection system of FIG. 2 with a component of the exemplary gas turbine engine.

Referring now also to FIG. 3, providing a close-up view of a portion of the inspection tool 100 and the component of the turbomachine 16, it will be appreciated that for the embodiment shown, the component is an airfoil, and more specifically, is an LP turbine rotor blade 60. In such a manner, it will be appreciated that the second side 112 of the LP turbine rotor blade 60 (as well as the first side 108 of the LP turbine rotor blade 60) is positioned within the interior 19 of the turbomachine 16, and more specifically, is positioned within the core air flowpath 37 of the turbomachine 16 (FIG. 2). The exemplary LP turbine rotor blade 60 depicted in FIG. 3 generally defines a pressure side and an opposite suction side. For the embodiment depicted, the first side 108 of the component, i.e., the first side 108 of the LP turbine rotor blade 60 for the embodiment depicted, is the suction side and the second side 112 of the component, i.e., the second side 112 of the LP turbine rotor blade 60 for the embodiment depicted, is the pressure side. In such a manner, the inspection tool 100 communicates the signal 114 between the first member 102 and the second member 110 from the suction side/first side 108 of the LP turbine rotor blade 60 to the pressure side/second side 112 of the LP turbine rotor blade 60. Notably, for the embodiment depicted, the receiver 104 is positioned at the distal end 122 of the robotic arm 116 and defines an uninterrupted path between the receiver 104/distal end 122 of the robotic arm 116 and the second side 112/pressure side of the LP turbine rotor blade 60. In at least certain exemplary embodiments, such may provide for a more accurate inspection of the LP turbine rotor blade 60.

Figure 4:
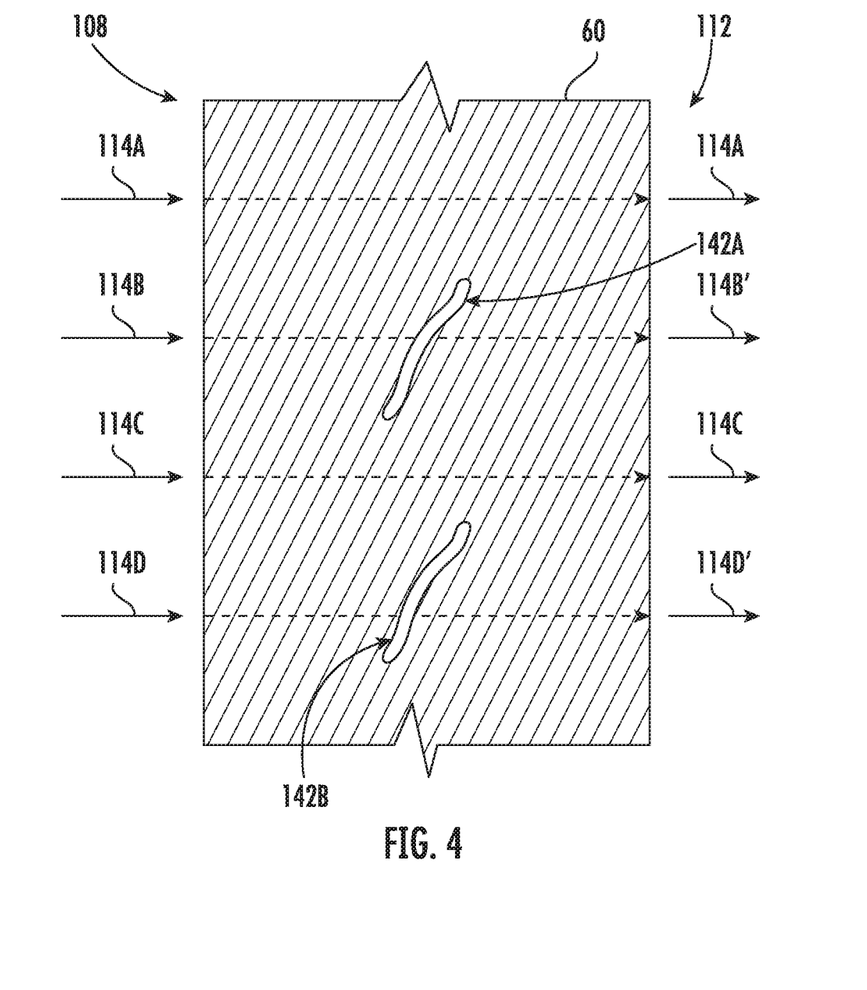
FIG. 4 is a close-up, cross-sectional view of the component of the exemplary gas turbine engine being inspected utilizing the exemplary inspection tool of FIG. 2.

More specifically, referring now to FIG. 4, a close-up, cross-sectional view of the component of FIG. 3, and more specifically, of the LP turbine rotor blade 60 of FIG. 3 between the suction side/first side 108 and pressure side/second side 112 is depicted. As is depicted, the exemplary LP turbine rotor blade 60 includes one or more defects 142 between the first side 108 and the second side 112. More specifically, the LP turbine rotor blade 60 includes a first defect 142A and a second defect 142B. The first and second defects 142A, 142B are each configured as cracks, for the embodiment depicted.

As is shown, the signal 114, which is directed at the first side 108 from the first member 102 (see FIG. 3) of the inspection tool 100 reaches the first side 108 of the LP turbine rotor blade 60 and travels through the LP turbine rotor blade 60. For explanation purposes, four separate signals 114 are depicted. More specifically, for the embodiment depicted, a first signal 114A, a second signal 114B, a third signal 114C, and a fourth signal 114D are depicted, each originating from the transmitter 106, which for the embodiment depicted is included with the first member 102.

As is shown, the first signal 114A and the third signal 114C travel uninterruptedly through the LP turbine rotor blade 60 from the first side 108 to the second side 112, as there are no defects 142 positioned in a transmission path for such signals 114 through the LP turbine rotor blades 60. The receiver 104 may accordingly receive the first signal 114A and third signal 114C after the signals 114A, 114C travel from the second side 112 of the LP turbine rotor blade 60. By contrast, however, the second signal 114B and third signal 114C are interrupted by the first defect 142A and second defect 142B, respectively. As noted, for the embodiment shown the first defect 142A and second defect 142B are each configured as a crack, and therefore define a void between the first side 108 and second side 112 of the LP turbine rotor blade 60. For the embodiment shown, the first defect 142A interrupts the second signal 114B (creating a modified second signal 114B'), such that the modified second signal 114B' travels from the second side 112 of the LP turbine rotor blade 60 to the receiver 104. Similarly, the second defect 142B interrupts the fourth signal 114D (creating a modified fourth signal 114D'), such that the modified fourth signal 114D' travels from the second side 112 of the LP turbine rotor blade 60 to the receiver 104. The receiver 104 may receive each of the modified signals 114B', 114D', and based on one or more characteristics of the individual signals 114, the controller 130 may determine there is a defect in the LP turbine rotor blade 60.

In certain exemplary aspects, the signal 114 communicated between the first member 102 and the second member 110 through the component is at least one of a transient impulse signal or a sustained elastic wave signal (such as acoustic and vibratory signals or shock waves), transient pulses or sustained electromagnetic waves (such as infrared signals, radio signals, X-ray signals, thermal signals, or other signals the electromagnetic spectrum. Additionally or alternatively, the signal 114 may be an ultrasound signal.

Based on the known characteristics of the signals 114 communicated by the transmitter 106, and the sensed characteristics of the signal 114 received by the receiver 104, the inspection tool 100 (or rather the controller 130 of the inspection tool 100) may determine whether or not the component being inspected, i.e., the LP turbine rotor blade 60 for the embodiments depicted, includes one or more defects 142. These characteristics may include, e.g., wavelength, strength, frequency, etc. However, in other exemplary aspects, the controller 130 may determine whether or not there is a defect in the component in any other suitable manner using the communicated signals 114. Notably, the characteristics of the signal 114 received by the receiver 104 may indicate, in addition to the presence of a defect 142, the severity of the defect 142, a depth of the defect 142, etc.

Figure 5:
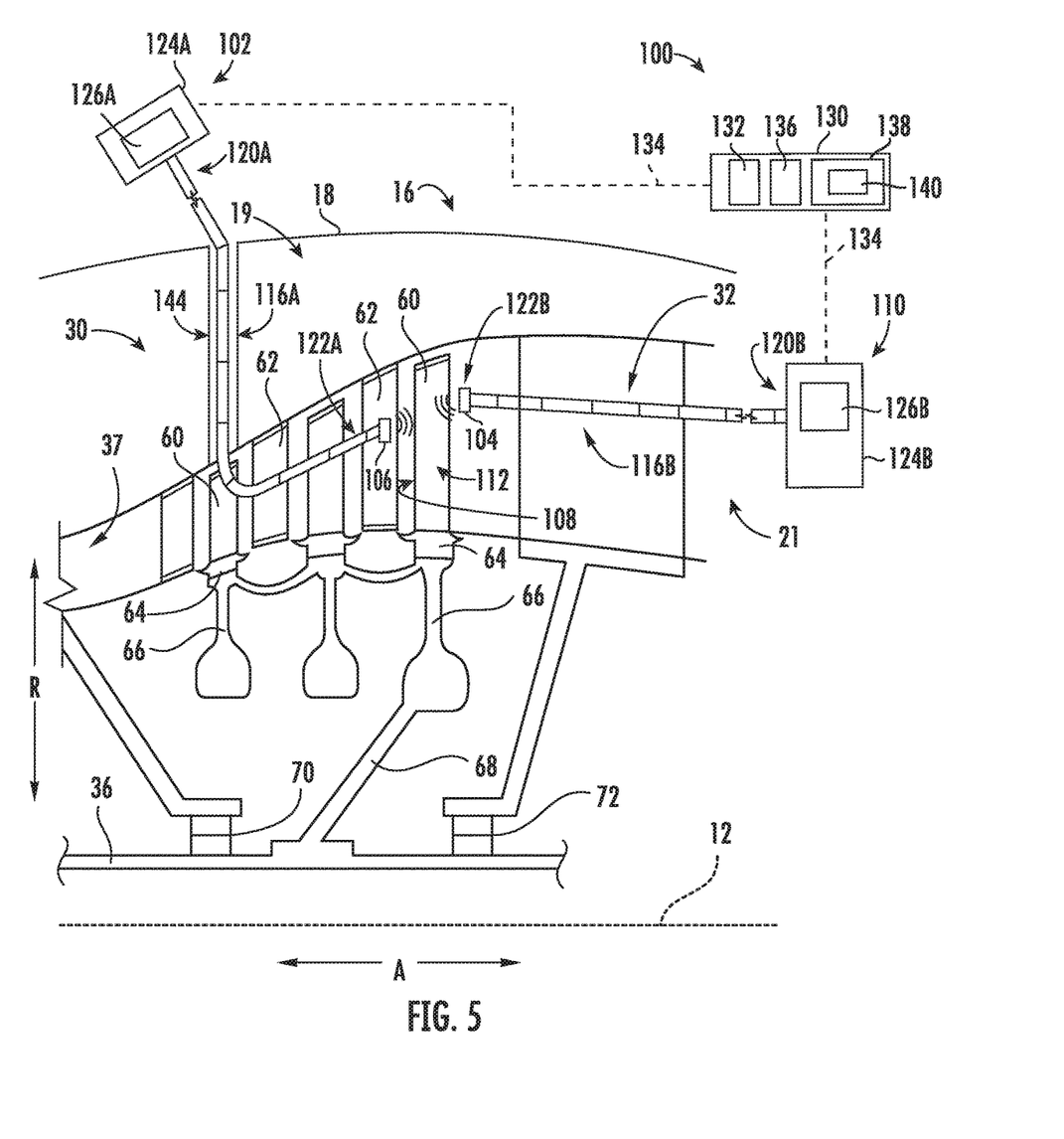
FIG. 5 is a close-up, cross-sectional view of an aft end of a gas turbine engine in accordance with another exemplary embodiment of the present disclosure including an inspection system also in accordance with another exemplary embodiment of the present disclosure.

It will be appreciated, however, that in other exemplary embodiments, the inspection tool 100 may have any other suitable configuration. For example, referring now to FIG. 5, an inspection tool 100 in accordance with another exemplary embodiment of the present disclosure is depicted, along with an aft end of a turbine section of a turbomachine 16 of an exemplary gas turbine engine. More specifically, FIG. 5 depicts an LP turbine 30 of a turbine section of a turbomachine 16 in accordance with an exemplary embodiment of the present disclosure. The exemplary LP turbine 30 of FIG. 5 may be configured in substantially the same manner as exemplary LP turbine 30 described above with reference to, e.g., FIG. 2. Accordingly, the same or similar numbers may refer to the same or similar parts.

Further, it will be appreciated that the exemplary inspection tool 100 of FIG. 5 is also configured in a similar manner to the exemplary inspection tool 100 described above. For example, the exemplary inspection tool 100 generally includes a first member 102 having at least one of a receiver 104 or a transmitter 106 directed at a first side 108 of the component, as well as a second member 110 having the other of the receiver 104 or the transmitter 106 directed at a second side 112 of the component to communicate a signal 114 with the first member 102 through the component. As with the embodiment above, the component of FIG. 5 is an LP turbine rotor blade 60, with the first side 108 being a suction side and the second side 112 being a pressure side (depicted schematically in FIG. 5).

Further, for the embodiment depicted, the second member 110 is configured as a robotic arm assembly including a robotic arm (i.e., a second robotic arm 116B) positioned at least partially within an interior 19 of the turbomachine 16 and extending through an opening of the turbomachine 16 (i.e., through an annular exhaust opening 21 for the embodiment depicted). However, for the embodiment of FIG. 5, the first member 102 is also configured as a robotic arm assembly including a robotic arm (i.e., a first robotic arm 116A). Notably, the exemplary turbomachine 16 depicted in FIG. 5 further defines a plurality of openings. More specifically, the exemplary turbomachine 16 depicted in FIG. 5 defines the annular exhaust 21 (see also FIG. 1), as well as one or more radial openings. More specifically, still, the exemplary turbomachine 16 depicted in FIG. 5 defines one or more borescope openings 144. The second robotic arm 116B of the second member 110 extends through the annular exhaust 21 and exhaust section 32 of the turbomachine 16, while the first robotic arm 116A of the first member 102 extends through one of the borescope openings 144 of the turbomachine 16. In such a manner, the first robotic arm 116A of the first member 102 may position at least one of the receiver 104 or transmitter 106 at a relatively remote location within the interior 19 of the turbomachine 16 to direct the at least one of the receiver 104 or transmitter 106 at the first side 108 of the LP turbine rotor blade 60. Similarly, the second robotic arm 116B of the second member 110 may position the other of the receiver 104 or transmitter 106 also at a relatively remote location within the interior 19 the turbomachine 16 to direct the other of the receiver 104 or transmitter 106 at the second side 112 of the LP turbine rotor blade 60. Such a configuration may further allow for an inspection of a relatively remotely positioned component within the turbomachine 16 without having to take the turbomachine 16 (and gas turbine engine including the turbomachine 16) off wing and/or disassemble the turbomachine 16 to expose such component.

Notably, for the embodiment depicted, the first robotic arm 116A and first robotic arm assembly (i.e., the first member 102), as well as the second robotic arm 116B and second robotic arm assembly (i.e., the second member 110) may each be configured in substantially the same manner as exemplary robotic arm 116 and robotic arm assembly described above with reference to, e.g., FIG. 2. Accordingly, each of the robotic arm assemblies may generally include a base 124A, 124B and one or more motors 126A, 126B, with root ends 120A, 120B of the respective robotic arms 116A, 116B coupled to the respective base 124A, 124B. Each of the robotic arms 116A, 116 B, further defines a distal end 122A, 122B, respectively, including the transmitter 106 and receiver 104, respectively, for the embodiment shown.

Figure 6:
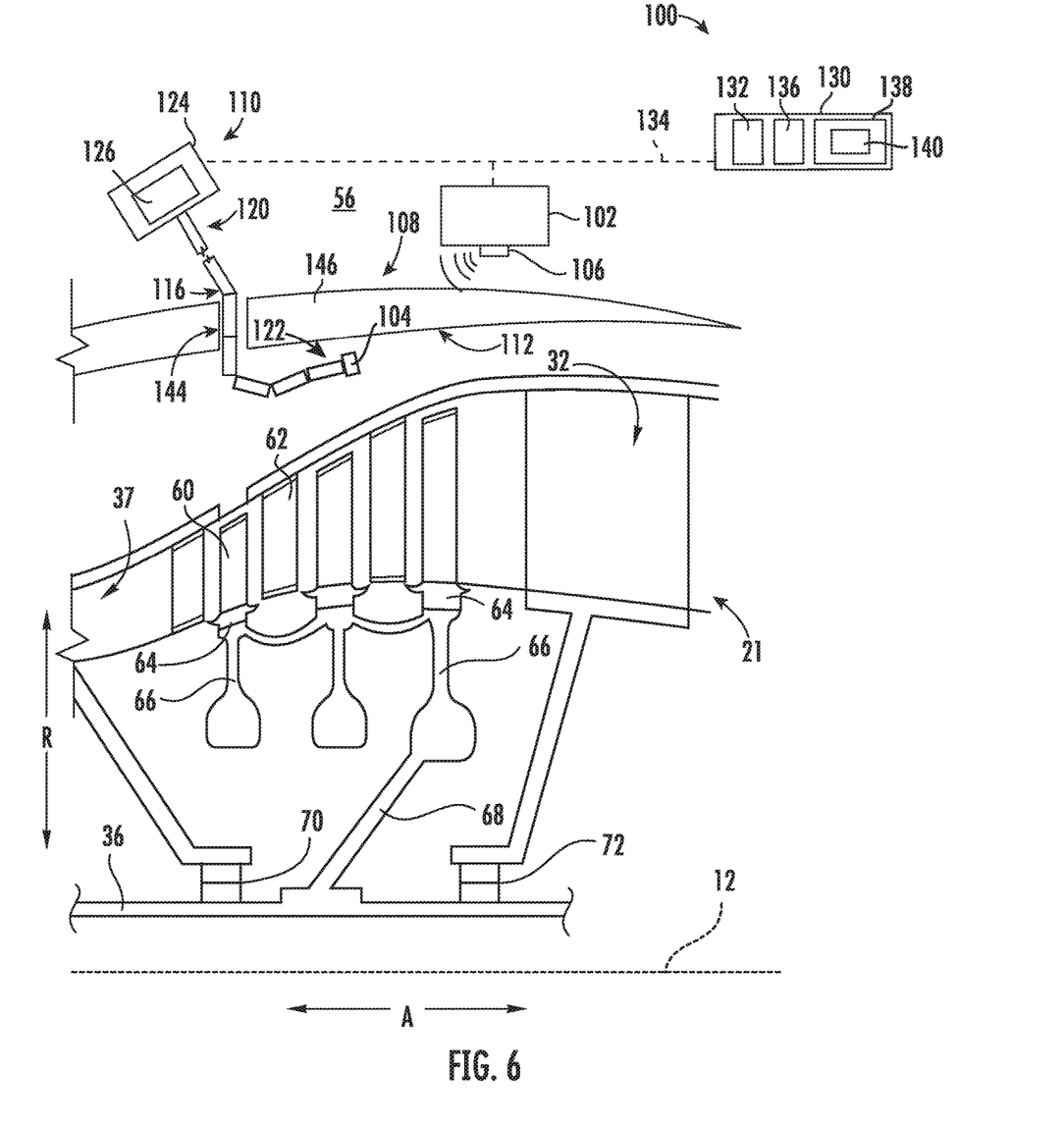
FIG. 6 is a close-up, cross-sectional view of an aft end of the gas turbine engine in accordance with yet another exemplary embodiment of the present disclosure including an inspection system also in accordance with yet another exemplary embodiment of the present disclosure.

It should further be appreciated, however, that in still other exemplary embodiments of the present disclosure, any other suitable component of the turbomachine 16 may be inspected using the exemplary inspection tool 100 described herein. For example, referring now to FIG. 6, an inspection tool 100 in accordance with another exemplary embodiment of the present disclosure is depicted, along with an aft end of a turbine section of a turbomachine 16 of an exemplary gas turbine engine. More specifically, FIG. 6 depicts an LP turbine 30 of a turbine section of a turbomachine 16 in accordance with an exemplary embodiment of the present disclosure. The exemplary LP turbine 30 of FIG. 6 may be configured in substantially the same manner as the exemplary LP turbine 30 described above with reference to, e.g., FIG. 2. Accordingly, the same or similar numbers may refer to the same or similar parts.

Further, it will be appreciated that the exemplary inspection tool 100 of FIG. 5 is also configured in a similar manner to the exemplary inspection tool 100 described above. For example, the exemplary inspection tool 100 generally includes a first member 102 having at least one of a receiver 104 or a transmitter 106 and directed at a first side 108 of the component, as well as a second member 110 having the other of the receiver 104 or the transmitter 106 and directed at a second side 112 of the component to communicate a signal 114 with the first member 102 through the component. Additionally, for the embodiment of FIG. 6, the second member 110 is configured as a robotic arm assembly including a robotic arm 116 extending between a root end 120 and a distal end 122.

However, by contrast to the exemplary embodiment described above, the component of the turbomachine 16 of FIG. 6 is not positioned within a core air flowpath 37 of the turbomachine 16. For example, while the component includes the second side 112 positioned within the interior 19 of the turbomachine 16, the second side 112 is not positioned within the core air flowpath 37 (i.e., is positioned outside of the core air flowpath 37). Additionally, despite the second side 112 of the component being positioned within the interior 19 the turbomachine 16, for the embodiment shown, the first side 108 of the component is positioned outside of the interior 19 of the turbomachine 16. More particularly, for the embodiment shown, the component is a casing member 146 of the turbomachine 16 (which may be part of the outer casing 18). The outer casing 18 includes an opening, which for the embodiment depicted as part of a borescope opening 144. The second member 110 extends through the borescope opening 144 such that the receiver 104 or transmitter 106 included with the second member 110 (i.e., at a distal end 122 of the robotic arm 116 of the second member 110) may be directed at the second side 112 of the component. It will further be appreciated that the first side of the component (i.e., the casing member 146) is, for the embodiment depicted, exposed to a bypass airflow passage 56 of the engine including the turbomachine 16.

Figure 7:
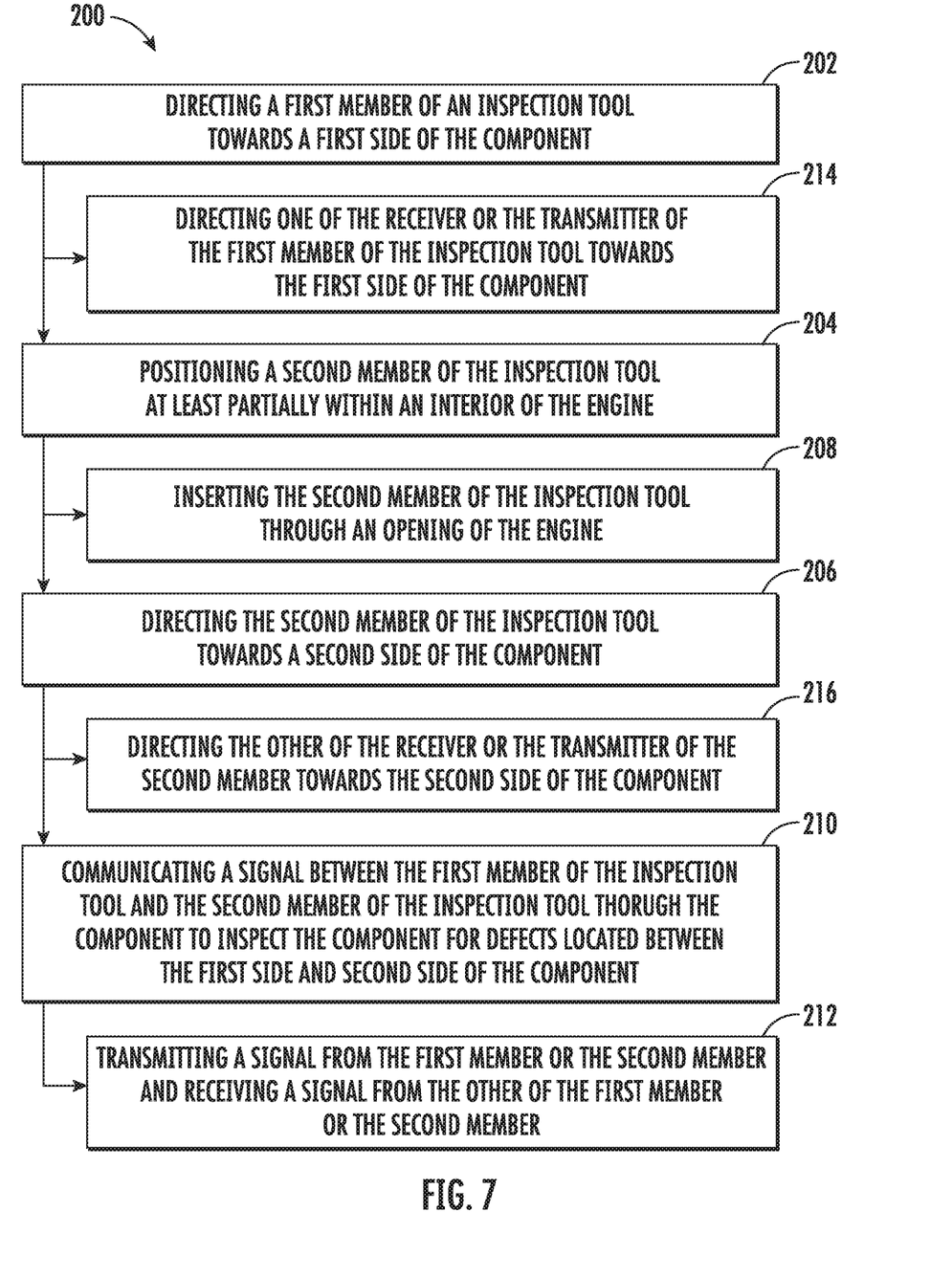
FIG. 7 is a flow diagram of a method for inspecting a component in accordance with an exemplary aspect of the present disclosure.

Referring now to FIG. 7, a method for inspecting a component of an engine in accordance with an exemplary aspect of the present disclosure is provided. The exemplary method 200 of FIG. 7 may utilize one or more of the exemplary inspection tools described above with reference to FIGS. 1 through 6.

The method 200 generally includes at (202) directing a first member of an inspection tool towards a first side of the component. The method 200 further includes at (204) positioning a second member of the inspection tool at least partially within an interior of the engine, and at (206) directing the second member of the inspection tool towards a second side of the component. In certain exemplary aspects, the second member is a robotic arm extending.

For example, in at least certain exemplary aspects, positioning the second member of the inspection tool at least partially within the interior of the engine at (204) includes at (208) inserting the second member of the inspection tool through an opening of the engine. More specifically, when the second member is configured as a robotic arm, inserting the second member of the inspection tool through an opening of the engine at (208) may include inserting the robotic arm through the opening of the engine.

The method 200 additionally includes at (210) communicating a signal between the first member of the inspection tool and the second member of the inspection tool through the component to inspect the component for defects located between the first side and second side of the component. For the exemplary aspect of FIG. 7, communicating the signal between the first member of the inspection tool and the second member of the inspection tool through the component at (210) includes at (212) transmitting a signal from the first member or the second member and receiving a signal from the other of the first member or the second member.

More specifically, for the exemplary aspect depicted, the first member includes one of a receiver or a transmitter. With such an exemplary aspect, directing the first member of the inspection tool towards the first side of the component at (202) includes at (214) directing one of the receiver or the transmitter of the first member of the inspection tool towards the first side of the component. Further, for the exemplary aspect depicted, the second member includes the other of the receiver or the transmitter. With such an exemplary aspect, directing the second side of the inspection tool towards the second side of the component at (206) includes at (216) directing the other of the receiver or the transmitter of the second member towards the second side of the component.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An engine assembly comprising:
    an engine comprising a component and defining an opening and an interior, the component including a first side and an opposite second side, the second side positioned within the interior of the engine; and
    an inspection tool comprising
        a first member comprising at least one of a receiver or a transmitter and directed at the first side of the component; and
        a second member comprising the other of the receiver or the transmitter and positioned at least partially within the interior of the engine and directed at the second side of the component to communicate a signal with the first member through the component, the second member being a robotic arm extending through the opening of the engine; and
        a controller configured to receive information indicative of a characteristic of the signal to determine information indicative of a defect in the component.

2. The engine assembly of claim 1, wherein the first member includes the transmitter, and wherein the second member includes the receiver.

3. The engine assembly of claim 1, wherein the engine is a turbomachine of a gas turbine engine.

4. The engine assembly of claim 3, wherein the opening is a borescope opening.

5. The engine assembly of claim 3, wherein the turbomachine defines a core air flowpath, and wherein the second side of the component is positioned within the core air flowpath.

6. The engine assembly of claim 3, wherein the turbomachine defines a core air flowpath, and wherein the second side of the component is positioned outside of the core air flowpath.

7. The engine assembly of claim 1, wherein the first member is positioned outside of the interior of the engine.

8. The engine assembly of claim 1, wherein the signal communicated between the first member and the second member through the component is at least one of an infrared signal, an ultrasound signal, an x-ray signal, or an inductive heat signal.

9. The engine assembly of claim 1, wherein the component of the engine is an airfoil, a shroud, or a liner.

10. The engine assembly of claim 1, wherein the robotic arm defines a distal end, and wherein the receiver or the transmitter is positioned at the distal end of the robotic arm.

11. The engine assembly of claim 1, wherein the robotic arm comprises a plurality of segments moveable relative to one another.

12. The engine assembly of claim 11, wherein the robotic arm extends between a root end and a distal end, wherein the plurality of segments extend from the root end to the distal end, and wherein the receiver or the transmitter is positioned at the distal end of the robotic arm.

13. The engine assembly of claim 1, wherein the robotic arm defines a length between the root end and the distal end of at least about 48 inches, and wherein the robotic arm defines a maximum diameter of less than about 3 inches.

14. A method for inspecting a component of an engine using an inspection tool, the method comprising:
    directing a first member of the inspection tool towards a first side of the component;
    positioning the second member of the inspection tool at least partially within an interior of the engine;
    directing the second member of the inspection tool towards a second side of the component, the second member being a robotic arm; and
    communicating a signal between the first member of the inspection tool and the second member of the inspection tool through the component to inspect the component for defects located between the first side and second side of the component.

15. The method of claim 14, wherein positioning the second member of the inspection tool at least partially within the interior of the engine comprises inserting the second member of the inspection tool through an opening of the engine.

16. The method of claim 14, wherein communicating the signal between the first member of the inspection tool and the second member of the inspection tool through the component comprises transmitting a signal from the first member or the second member and receiving a signal from the other of the first member or the second member.

17. The method of claim 14, wherein the first member comprises one of a receiver or a transmitter, and wherein directing the first member of the inspection tool towards the first side of the component comprises directing one of the receiver or the transmitter of the first member of the inspection tool towards the first side of the component.

18. The method of claim 17, wherein the second member comprises the other of the receiver or the transmitter, and wherein directing the second side of the inspection tool towards the second side of the component comprises directing the other of the receiver or the transmitter of the second member towards the second side of the component.

19. A tool for inspecting an engine, the engine having a component, the component having a first side and a second side, the first side being within an interior of the engine, the tool comprising:
    a first member comprising at least one of a receiver or a transmitter;
    a second member comprising the other of the receiver or the transmitter and configured as a robotic arm, the robotic arm moveable to the interior of the engine to a location directed at the second side of the component to communicate a signal with the first member through the component for inspecting the component and
    a controller configured to receive information from the first member, the second member, or both indicative of a characteristic of the signal to determine information indicative of a defect in the component.

20. The tool of claim 19, wherein the first member includes the transmitter, and wherein the second member includes the receiver.

* * * * *